(12) United States Patent
Ahluwalia

(10) Patent No.: US 6,946,648 B2
(45) Date of Patent: Sep. 20, 2005

(54) OPTO-ELECTRONIC DEVICE FOR ANGLE GENERATION OF ULTRASONIC PROBE

(75) Inventor: Surjit Singh Ahluwalia, Chandigarh (IN)

(73) Assignee: Council of Scientific and Industrial Research, New Delhi (IN)

( * ) Notice: Subject to any disclaimer, the term of this patent is extended or adjusted under 35 U.S.C. 154(b) by 0 days.

(21) Appl. No.: 10/403,990

(22) Filed: Mar. 31, 2003

(65) Prior Publication Data

US 2004/0188601 A1 Sep. 30, 2004

(51) Int. Cl.⁷ .................................................. G01D 5/34
(52) U.S. Cl. ............................ 250/231.13; 250/231.17; 341/13
(58) Field of Search ....................... 250/231.13, 231.14, 250/231.17; 341/13, 33; 356/616–617, 620

(56) References Cited

U.S. PATENT DOCUMENTS

| | | | | |
|---|---|---|---|---|
| 3,886,562 A | * | 5/1975 | Atzinger et al. | 346/32 |
| 3,999,063 A | * | 12/1976 | Luger | 250/231.13 |
| 4,427,970 A | * | 1/1984 | Devol | 341/6 |
| 5,138,564 A | * | 8/1992 | de Jong et al. | 702/96 |
| 5,206,645 A | * | 4/1993 | Urich | 341/11 |
| 6,396,052 B1 | * | 5/2002 | Barry et al. | 250/231.13 |

* cited by examiner

Primary Examiner—David Porta
Assistant Examiner—Patrick J. Lee
(74) Attorney, Agent, or Firm—Dority & Manning, P.A.

(57) ABSTRACT

A system for accurately sensing/determining the position of an uniformly rotating shaft characterized in using a single marker in tandem with a high frequency signal, said system comprising a shaft mounted with a disc having a single marker, an opto-electronic device placed in front of the disc for generating a "marker signal" for every rotation of the disc, a means for producing a high frequency signal for sampling/slicing/slotting the time period between two consecutive marker signals, input terminals of a gating mechanism being connected to the opto-electronic device and the high frequency signal generator and an output terminal being connected to a counter such that the gating mechanism allows the high frequency signal to pass to the counter and said counter being configured for counting the number of pulses in the high frequency signal, a D/A converter connected to an output of the counter for converting the number of pulses counted into an analog signal and optionally, a display mechanism for displaying the analog signal in terms of the angle through which the shaft has rotated.

28 Claims, 2 Drawing Sheets

OPTO-ELECTRONIC DEVICE FOR ANGLE GENERATION OF ULTRASONIC PROBE

FIELD OF THE INVENTION

This present invention relates to a device for accurate angle generation of ultrasonic sector transducer by using an opto-electronic system. The device of present invention is particularly useful for the angle generation of smoothly rotating transducer head of ultrasonic probe. More particularly, the present invention relates to a system for accurately sensing/determining the position of a uniformly rotating shaft characterized in using a single marker in tandem with a high frequency signal.

BACKGROUND AND THE PRIOR ART OF THE INVENTION

Figure 1A:
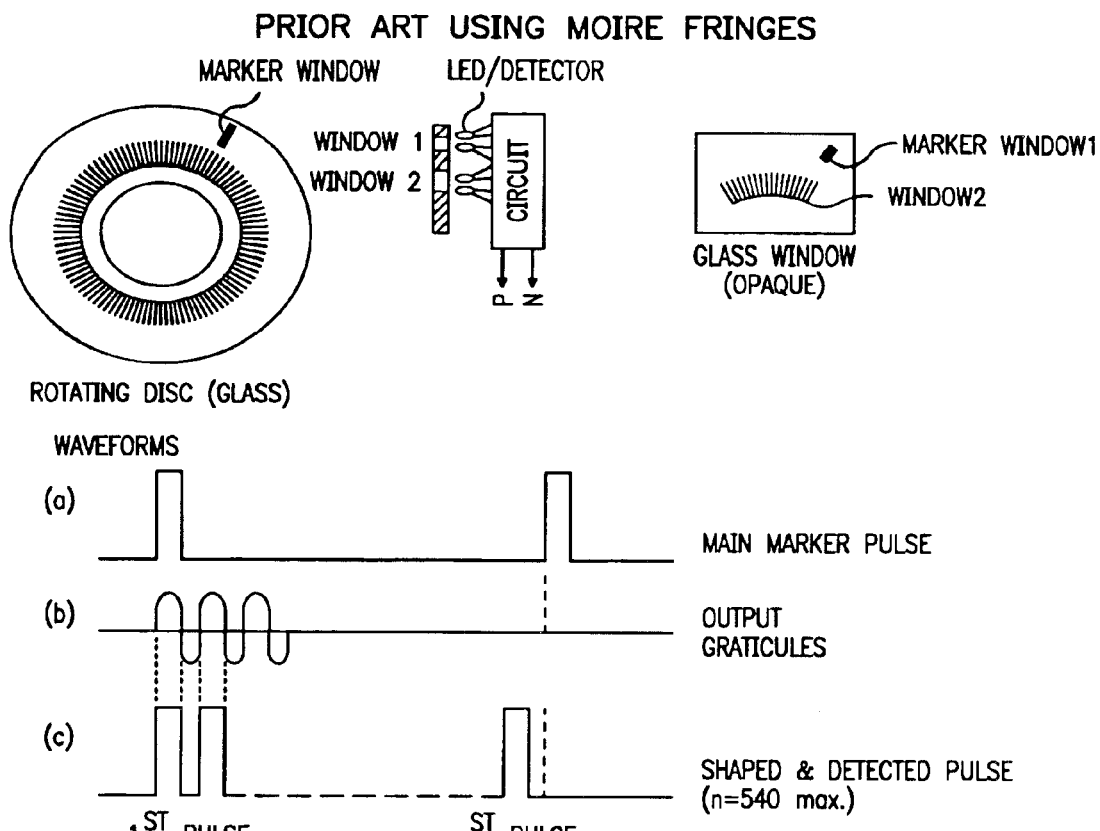

It has hitherto been known to achieve the above objective with an optical encoder. Optical encoders normally used for this purpose have a round rotating glass/Perspex disc having 'n' graticules on its periphery and a marker on one side and dull black background. It is fixed on the shaft. An opaque rectangular disc with three windows (one window in front of marker, and two windows having graticules with mark/space ratio corresponding to rotating disc) is mounted on the static surface in front of rotating disc with its marking face towards round disc with minimum spacing between the discs. The lines on both discs are evenly spaced, and the line width is equal to the spacing between adjacent lines. A light source (LED) is placed at the back of stationary plate. The light reflected back through the graticule window area of the static plates is detected by the photosensor. When the lines on the two discs coincide, minimum amount of light is reflected. When the lines on One disc are fully over transparent portion of second disc, maximum amount of light will be reflected. Accordingly as rotor disc moves relative to stator disc, a sine type waveform is generated by the photosensor. Moire fringes shadow patterns as shown in FIG. 1(A) are formed in this manner.

The frequency of sine waves is proportional to number of graticules 'n' on the rotating disc/revolution of shaft. Value of 'n' can be 50, 100, 250, 360, 500 and 540. Some commercial available encoders are listed in Table 1.

The main shortcoming of existing method is that the maximum possible graticules/mm for a small encoder (17.2 mm diameter disc) is limited to about 'Ten' where proper alignment with other disc is achievable. This results in about 540 graticules per circle resulting in 540 pulses/revolution. The maximum count frequency is limited to 200 KHz only.

OBJECTS OF THE INVENTION

The main object of present invention is to develop an opto-electronic device consisting of a small glass/Perspex rotating disc with only one marker/few markers, single window and a set of LED-detectors to generate accurately one pulse/revolution of shaft. Electronic circuits have been used to generate more pulses proportionally spaced in this time interval resulting in much simpler overall system which meets all the functional requirements of a high resolution optical encoder with much less cost.

Another object of the present invention is to improve the higher frequency performance of the device. At present the maximum count frequency of operation is 200 KHz.

Still another object of the present invention is to improve the output resolution of the device. At present the output resolution is 540 pulses/revolution and is proportional to the number of graticules on the rotating disc.

SUMMARY OF THE INVENTION

The present invention relates to a device for accurate angle generation for ultrasonic sector transducer by using an opto-electronic system. The device of present invention is particularly useful for the angle generation of smoothly rotating transducer head of ultrasonic probe. The novelty of the device is that it does away with the conventional Moire fringes/graticules on round disk and uses only a single marker to sense/detect the angular rotation of probe and generates pulses proportional within this time using either voltage controlled oscillator (VCO) technique or BCD Rate Multiplier (BRM) technique. Another novelty of the device is that it reduces the dimensions of the round rotating disk while increasing the output resolution.

DETAILED DESCRIPTION OF THE INVENTION

Accordingly, the present invention provides a system for accurately sensing/determining the position of an uniformly rotating shaft characterized in using a single marker in tandem with a high frequency signal, said system comprising a shaft mounted with a disc having a single marker, an opto-electronic device placed in front of the disc for generating a "marker signal" for every rotation of the disc, a means for producing a high frequency signal for sampling/slicing/slotting the time period between two consecutive marker signals, input terminals of a gating mechanism being connected to the opto-electronic device and the high frequency signal generator and an output terminal being connected to a counter such that the gating mechanism allows the high frequency signal to pass to the counter and said counter being configured for counting the number of pulses in the high frequency signal, a D/A converter connected to an output of the counter for converting the number of pulses counted into an analog signal and optionally, a display mechanism for displaying the analog signal in terms of the angle through which the shaft has rotated.

In an embodiment of the present invention, the disc may be made of metal sheets, plastic, glass, Perspex, card board etc.

In another embodiment of the present invention, the disc and the marker are constructed such that they absorb/reflect different quantities of light.

In yet another embodiment of the present invention, the disc may be transparent and the marker may be opaque.

In still another embodiment of the present invention, the disc may be opaque and the marker may be transparent.

In one more embodiment of the present invention, the disc may be made up of non-reflecting type material and the marker may be made up of reflecting type material.

In one another embodiment of the present invention, the marker may be coated with chromium for reflection.

In a further embodiment of the present invention, the system may optionally have an opaque plate having a window placed in between the disc and the opto-electronic device.

In an embodiment of the present invention, the window on the opaque plate is in front of the marker.

In another embodiment of the present invention, the opaque plate may be in the form of a disc.

In yet another embodiment of the present invention, the opaque plate may be made up of glass, metal sheet, card board etc.

In still another embodiment of the present invention, the opaque plate is made up of glass coated with dark dull paint with window spacing transparent.

In one more embodiment of the present invention, the opto-electronic device for generating the marker signal is placed in front of the marker.

In one another embodiment of the present invention, the opto-electronic device comprises a light source and a light detecting means.

In a further embodiment of the present invention, the light source may be selected from the group comprising of LED and bulb.

In an embodiment of the present invention, the light detecting means may be selected from group comprising of photo detector, photodiodes and CCD detectors.

In another embodiment of the present invention, the light detecting means produces a "marker signal" indicating the presence of the marker.

In yet another embodiment of the present invention, the marker signal thus produced is detected and optionally shaped.

In still another embodiment of the present invention, the marker signal thus produced acts as a gating signal to the high frequency signal.

In one more embodiment of the present invention, the frequency of the high frequency signal may be set by the operator at any value or using an EPROM-VCO circuit or EPROM-BCD rate multiplexer.

In one another embodiment of the present invention, the frequency of the high frequency signal is higher than the time period between two consecutive marker signals.

In a further embodiment of the present invention, the frequency of the high frequency is adjusted instantaneously and automatically by the EPROM-VCO circuit or EPROM-BCD rate multiplexer if the rotating frequency of the shaft varies.

In an embodiment of the present invention, the gating mechanism comprises of two NAND gates and a NOT gate.

In another embodiment of the present invention, the counter counts the number of pulses between two consecutive marker pulses.

In yet another embodiment of the present invention, the counter is a "N" bit counter wherein the value of 'N' depends upon the gating time and high frequency clock.

In still another embodiment of the present invention, the marker signal resets the counter.

In one more embodiment of the present invention, the output of the counter is given to a D/A converter.

In one another embodiment of the present invention, the D/A converter produces a ramp type signal.

In a further embodiment of the present invention, the display device may be calibrated to display the output of the D/A converter in terms of the angle through which the shaft has rotated.

The inventors found that a single marker disc and a high frequency signal alone works for a uniformly rotating shaft rotating at a precisely fixed frequency. This idea is also novel and is very simple. However, the problem with such a system is that the system will result in incorrect readings if shaft frequency increases/decreases even slightly. This is because of a fixed high frequency generator used. If the frequency of the high frequency generator is adjusted by an operator with change in the speed of the shaft, the system will work perfectly. However, in that case, an exclusive manual operator is required.

Thus the Inventors in the present invention have provided a system that automatically varies or changes the high frequency also. This is what is done by the EPROM-VCO or EPROM-BCD rate multipliers. Thus, by the incorporation of the said additional parts, the high frequency generator provides a new high frequency signal every time the speed of the shaft varies. The EPROM in this case can also be suitable programmed and used with the electronic circuit as shown to increase the resolution of existing encoders.

The system of the present invention more particularly consists of an optical arrangement to precisely detect revolution time of shaft and an electronic circuit to generate pulses proportionally relative to 360° shaft rotation time was developed. If with one marker, the rotational speed is 1 Hz (1000 ms), exactly 360 pulses will be obtained per sec. However, if the rotational speed becomes a little faster say 995 ms, then the system output pulse rate will change proportionally giving output pulses at 360.0/995 ms=361.8 cycles/sec. So in 1000 ms time, the number of pulses generated will be exactly 360. Similarly for slower rotation of shaft, the pulse frequency will reduce proportionally.

The device of the present invention essentially consists of the following subsytems:
1. Optical system.
2. Electronic subsystem using a Voltage Controlled Oscillator (VCO) or Electronic sub system using a BCD rate multiplier (BRM).

Figure 2:
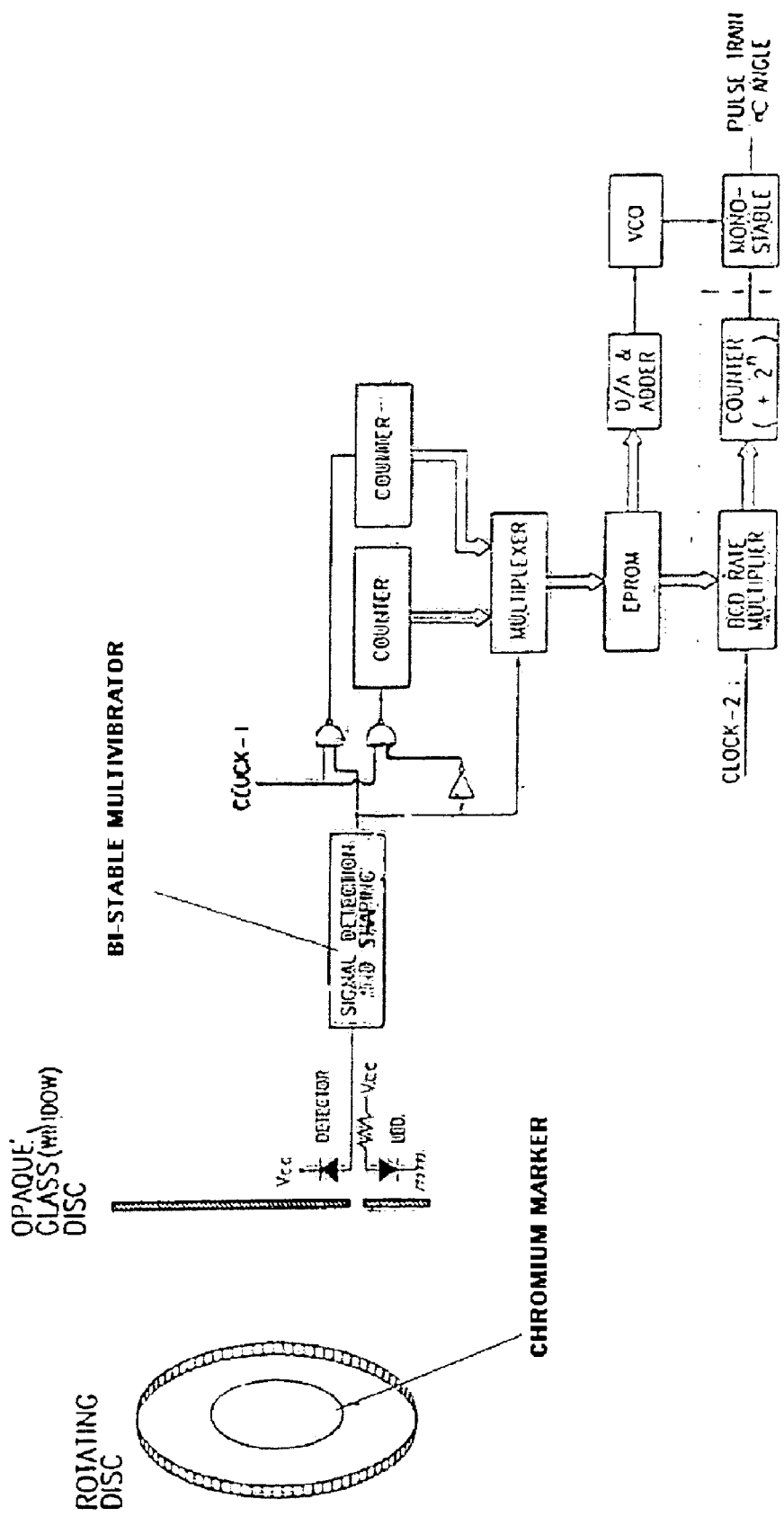

In FIG. 2 of drawing, the block diagram of device of present invention is shown where in the optical system consisting of rotating disc with chromium marker (for reflection), an opaque glass disc with window, LED and detector generate one pulse per shaft revolution. This pulse is detected and shaped and passed through a bi-stable multivibrator to get a high and low duration pulse train. To know this high and low duration time interval accurately, this signal acts as a gating signal and allows a high frequency clock-1 (4 KMx, for 0.25 ms resolution and 10 KHz for 0.1 ms resolution for 100 ms shaft rotation time). During this interval which is counted by two different 'n' bit binary counters for low and high duration time. A multiplexer controlled by this signal and connected at the output of these counters select either interval and provides a count number that is proportional to the time interval. Two methods have been employed to accurately generate the pulse train for angle generation.

In both the methods, corresponding to the shaft revolution time, the angles in degrees are calculated w.r.t. a fixed time. For example, for me shaft revolution time of 100 ms (10 Hz), the desired output is 360.0. Similarly for other values of time, the desired angle reading is calculated. This is explained in detail in Example 1 and Example 2 subsequently.

Summary of Operation of the Device:

A method for generating pulses corresponding to rotational angle by using VCO/BCD Rate.

Multipliers wherein the said method comprises of the following steps:

1. Selecting a time span over which the device is to be operated and calculating the desired frequency by dividing 360° rotational angle by each time value.

2. Selecting components of VCO to operate near center frequency (3600 Hz) with input voltage adjusted at its mid value. Adjusting DC input to the VCO to obtain the desired frequency reading corresponding to chosen time.

3. Repeating step (2) to generate a series of VCO input voltage readings corresponding to a desire time interval.

4. Storing the VCO input voltage values and the corresponding time range in the EPROM in Hex form.

5. Converting the EPROM Digital output (corresponding to each time) to analog voltage through D.A. converter and adder and given to VCO to generate output angle pulses proportional to rotational time (FIG. 2).

6. In case of BCD rate multipliers, a decimal fraction of desired frequency reading becomes the multiplying factor by which clock is to be multiplied to generate output pulses proportional to rotational time FIG. 2.

BRIEF DESCRIPTION OF THE ACCOMPANYING DRAWINGS

In the drawings accompanying the specification,

FIG. 1.A: Shows the prior art using Moire fringes and waveforms.

Figure 1B:
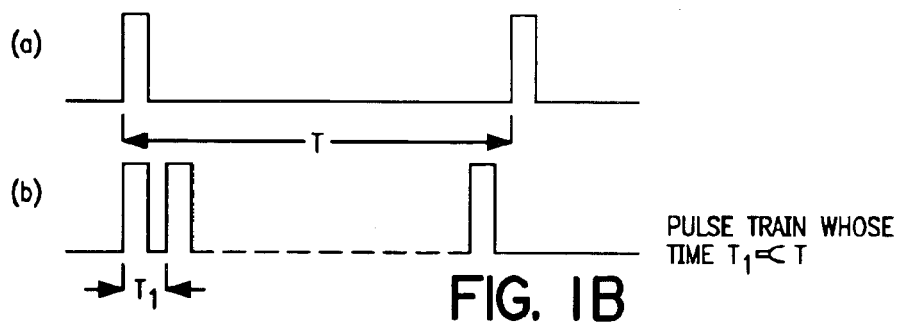

FIG. 1B: (a) Shows output using single marker. (b) Shows corresponding pulse train with T1 proportional to T.

Figure 1C:
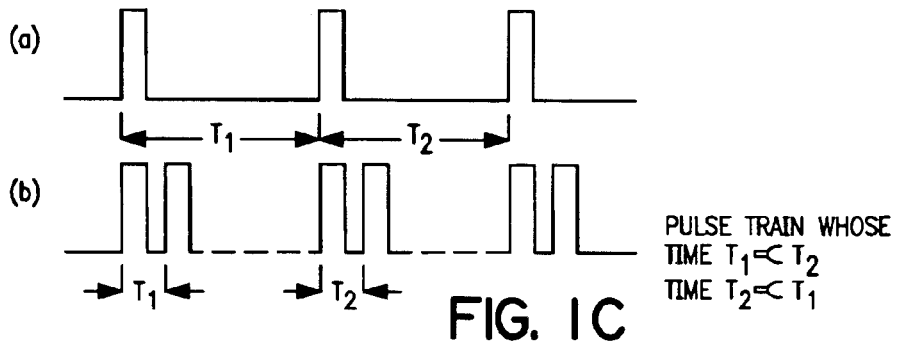

FIG. 1C: (a) Shows output with two markers. (b) Shows corresponding pulse trains with T1 proportional to $T_x$ and $T_2$ proportional to $T_y$.

FIG. 2.: Shows the overall block diagram of the system.

The present invention is further described in detail with respect to the following examples which are given purely for the purpose of illustration and hence, should not be construed to limit the scope of the present invention in any manner.

EXAMPLE 1 (USING VCO)

In the first method a Voltage Controlled Oscillator (VCO) has been used for generating proportionally spaced angle output. In this method, the VCO is first adjusted so as to get say 360.00 pulses at the center freq. Of 10 Hz (100 ms). Corresponding to this reading, the VCO input voltage is noted. Similarly the VCO input voltage is noted for all values from 89 ms to 111 ms at an interval of 0.25 ms (for more accuracy) thus generating 88 readings. The VCO voltage varies from 8.022V (corresponding to 89 ms) to 8.975V (corresponding to 111 ms). This has been interpreted as static part (1.022) and variable past (8.975-8.022-0.953). The variable voltage corresponding to each 0.25 ms interval is converted into hex and stored in EPROM. A 10-bit D/A converter has been used to handle this variable part. During the operation of devices, the D/A and adder output, provide exactly the reverse of above to get the desired output frequency from VCO. More readings can be stored, for higher accurate results. Though the electronic circuit given above is designed from 89 ms (11.2 Hz) to 111 ms (9 Hz), this design is of general nature and can be implemented for any desired chosen range. The pulses obtained are uniform and at proportional distance.

EXAMPLE 2 (USING BRM)

The Second method is by using CMOS BCD Rate Multiplier (BRM). In this method, a fractional value (F) has been calculated corresponding to the desired reading. The input clock-2 ($1\times10^4$ Hz) gets multiplied with the fractional value to provide angle output using BCD rate multipliers operated in add mode. In this mode, the output frequency rate is clock rate multiplied by sum of 0.1 BCD Digit, 0.01 BCD Digit, 0.001 BCD Digit. The time interval from 89 ms to 111 ms i.e. 22 ms has been divided with 0.1 ms resolution obtaining 220 fractional factors which are stored in EPROM. The block diagram for this method is shown in FIG. 1 (lower portion). In this method also the time interval of one revolution of shaft has been accurately recorded and given to EPROM. This EPROM provides a fractional value by which input clock is to be multiplied to get exact angle frequency output as explained above. Thus with a clock-2 of $1\times10^4$ Hz and with a fraction value of 0.4, the BCD rate multiplier gives 4.0 KHz as output frequency. The value of 'n' in the last block should be at least two (n=2). A mono-stable multivibrator is connected at the output to provide fixed pulse width.

This circuit is more stable, as there is no effect of temperature and time. A crystal controlled clock has been used for accuracy. A much wider frequency range is possible with this design. Extending this principal, more marker lines (2, 3 or more) can be drawn on the glass disc with precision at equal interval to get output pulses (FIG. 1C). For this modification the registration accuracy of time interval between pulses has to be with adequate resolution (at least 0.01) for smooth frequency output as the modified clock in this case has a frequency equal to original clock frequency multiplied by the number of markings on the disc. The main marker should have slightly broader area to indicate starling point. Rest of procedure is same.

This modification reduces delay in generating pulse train by ½, ⅓, cycles etc. and also takes care of non-uniform motion of shaft rotation if any resulting thereby resulting in a more efficient device. Dimensions of disc (presently D=7.2 mm, with, marker at radius of 5.6 to 6.6 mm) can be further reduced resulting in a still smaller device. The mechanical type Ultrasound Probe works from 8 Hz–15 Hz only. This procedure, although designed basically for mechanical Ultrasound probe can be used to design a general purpose encoder also.

ATTACHMENT WITH OTHER DEVICES

The glass/Perspex rotating disc with one marker is made dull black at the back surface and attached with the shaft of rotating surface. In Ultrasonic scanning probe, it is fixed on the scan head. Thus when the shaft moves the disc moves. The opaque glass disc is at a few mm distance from glass disc and is fixed on the stator. LED/Detector pair is fixed at the back of the opaque glass disc.

ADVANTAGES OF THE PRESENT DEVICE

1. It simplifies the design of serial encoder with only one marker/few markers on a small disc mounted on shaft & needs one LED/detector and single window on stator thus eliminating costly components.

2. With the invented system higher frequency output resolution is possible. In serial optical encoder maximum achievable resolution depends on no. of graticules on disc and so far is 512/1024 pulses/revolution. It is much less in magnetic encoders. Here higher resolution is possible e.g. 360 pulses/rotation, 720 pulses/rotation, 1440 pulses/rotation etc.

3. The Moire fringes detection circuit in serial encoder is normally put inside the probe housing to solve noise picking problems due to probe length which arc not in our design.

4. Serial optical encoder requires precision alignment between disc graticules & window graticules for generating single freq. output due to formation of smooth Moire fringes & its detection. This alignment can get disturbed if probe develops a fault and is repaired and mis-aligned during fixtures—giving rise to multiple frequencies and so it may generate error in angle measurement.

What is claimed is:

1. A system for accurately sensing and determining the position of a uniformly rotating shaft characterized in using a single marker in tandem with a high frequency signal, said system comprising:
   a shaft mounted with a disc having a single marker;
   an opto-electronic device placed in front of the disc for generating a marker signal for every rotation of the disc;
   a means for producing a high frequency signal for sampling/slicing/slotting the time period between two consecutive marker signals;
   input terminals of a gating mechanism being connected to the opto-electronic device and the high frequency signal generator;
   an output terminal being connected to a counter such that the gating mechanism allows the high frequency signal to pass to the counter, said counter being configured for counting the number of pulses in the high frequency signal;
   a D/A converter connected to an output of the counter for converting the number of pulses counted into an analog signal; and
   a display mechanism for displaying the analog signal in terms of the angle through which the shaft has rotated.

2. A system as defined in claim 1, wherein the disc is made of metal sheets, plastic, glass, acrylic resin or card board.

3. A system as defined in claim 1, wherein the disc and the marker are constructed such that they absorb/reflect different quantities of light.

4. A system as defined in claim 3, wherein the disc is transparent and the marker is opaque.

5. A system as defined in claim 3, wherein the disc is opaque and the marker is transparent.

6. A system as defined in claim 3, wherein the disc is made up of non-reflecting type material and the marker is made up of reflecting type material.

7. A system as defined in claim 3, wherein the marker is coated with chromium for reflection.

8. A system as defined in claim 1, wherein the system has an opaque plate having a window placed in between the disc and the opto-electronic device.

9. A system as defined in claim 8, wherein the window on the opaque plate is in front of the marker.

10. A system as defined in claim 8, wherein the opaque plate is in the form of a disc.

11. A system as defined in claim 8, wherein the opaque plate is made up of glass, metal sheet, acrylic resin, or card board.

12. A system as defined in claim 11, wherein the opaque plate is made up of glass coated with dark paint with transparent window spacing.

13. A system as defined in claim 1, wherein the opto-electronic device for generating the marker signal is placed in front of the marker.

14. A system as defined in claim 13, wherein the opto-electronic device comprises a light source and a light detecting means.

15. A system as defined in claim 14, wherein the light source is selected from the group consisting of LED and bulb.

16. A system as defined in claim 14, wherein the light detecting means is selected from group consisting of a photo detector, photodiode and CCD detector.

17. A system as defined in claim 14, wherein the light detecting means produces a marker signal indicating the presence of the marker.

18. A system as defined in claim 17, wherein the marker signal produced is detected and optionally shaped.

19. A system as defined in claim 17, wherein the marker signal produced acts as a gating signal to the high frequency signal.

20. A system as defined in claim 1, wherein the frequency of the high frequency signal is set by an operator, EPROM-VCO circuit, or EPROM-BCD rate multiplexer.

21. A system as defined in claim 20, wherein the frequency of the high frequency is adjusted instantaneously and automatically by the EPROM-VCO circuit or EPROM-BCD rate multiplexer if the rotating frequency of the shaft varies.

22. A system as defined in claim 1, wherein the gating mechanism comprises two NAND gates and a NOT gate.

23. A system as defined in claim 1, wherein the counter counts the number of pulses between two consecutive marker pulses.

24. A system as defined in claim 1, wherein the counter is an N bit counter, wherein the value of N depends upon the gating time and high frequency clock.

25. A system as defined in claim 1, wherein the marker signal resets the counter.

26. A system as defined in claim 1, wherein the output of the counter is given to a D/A converter.

27. A system as defined in claim 1, wherein the D/A converter produces a ramp type signal.

28. A system as defined in claim 1, wherein the display device is calibrated to display the output of the D/A converter in terms of the angle through which the shaft has rotated.

* * * * *